United States Patent
Olofsson et al.

(10) Patent No.: US 9,849,374 B2
(45) Date of Patent: Dec. 26, 2017

(54) AUTOMATIC GENERATION OF SOCIAL GROUP FOR AN ONLINE-USER

(71) Applicant: KING.COM LIMITED, St. Julians (MT)

(72) Inventors: Jonas Olofsson, Stockholm (SE); Jan Zetterman, Stockholm (SE); Patrik Stymne, Stockholm (SE); Sebastian Knutsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 475 days.

(21) Appl. No.: 14/088,947

(22) Filed: Nov. 25, 2013

(65) Prior Publication Data

US 2015/0148136 A1    May 28, 2015

(51) Int. Cl.
  *G06F 15/16*   (2006.01)
  *A63F 13/30*   (2014.01)
  *A63F 13/795*  (2014.01)
  *A63F 13/352*  (2014.01)

(52) U.S. Cl.
  CPC .............. *A63F 13/12* (2013.01); *A63F 13/30* (2014.09); *A63F 13/352* (2014.09); *A63F 13/795* (2014.09); *A63F 2300/5566* (2013.01)

(58) Field of Classification Search
  CPC .............. A63F 13/795; G07F 17/3274; G07F 17/3276; G06Q 50/01
  See application file for complete search history.

(56) References Cited

U.S. PATENT DOCUMENTS

| | | | |
|---|---|---|---|
| 2003/0220145 A1* | 11/2003 | Erickson | A63F 13/02 463/47 |
| 2012/0311036 A1* | 12/2012 | Huhn | 709/204 |
| 2013/0318085 A1* | 11/2013 | Pepper | 707/737 |
| 2013/0325948 A1* | 12/2013 | Chen et al. | 709/204 |
| 2014/0024462 A1* | 1/2014 | Qiang et al. | 463/42 |
| 2015/0057084 A1* | 2/2015 | Lin et al. | 463/42 |
| 2015/0234913 A1* | 8/2015 | Mai et al. | 463/42 |

* cited by examiner

*Primary Examiner* — Lawrence Galka

(74) *Attorney, Agent, or Firm* — Saul Ewing Arnstein & Lehr LLP

(57) ABSTRACT

A method comprises the steps of: selecting in a server, a subset of a plurality users of an online environment for a first user, wherein when in said online environment, said first user interacts with one or more users of said subset of the plurality users.

19 Claims, 10 Drawing Sheets

AUTOMATIC GENERATION OF SOCIAL GROUP FOR AN ONLINE-USER

FIELD OF EMBODIMENTS

Some embodiments may relate to a computer-implemented game in an online environment.

BACKGROUND

A technical challenge associated with computer-implemented games is how to provide an environment where two or more users can play together or interact. In particular, some computer implemented games may have a very large number of players. Selecting a player at random to play against another player may provide an unsatisfactory experience for one or both of the players if they are mismatched.

SUMMARY

According to an aspect, there is provided a method comprising the steps of: selecting in a server, a subset of a plurality of users of an online environment for a first user, wherein when in said online environment, said first user interacts with one or more users of said subset of said plurality of users.

The method may comprise causing data associated with one or more users of said subset of users to be provided to a device of said first user.

The selecting may comprise assigning at least some of said subset of users from a queue.

The method may comprise adding said first user to a queue, from which said first user can be selected for a subset of users for a different user.

The selecting may comprise adding a further user to said subset when said first user is added to a subset associated with said further user.

The adding a further user to said subset may be repeated until the subset of users has a desired number of users.

The method may comprise performing said selecting step until the subset of users has a desired number of users.

The selecting may comprise selecting a first set of users for said subset and subsequently selecting a further set of users which are added to said subset which contains said first set of user.

The subsequently selecting may be repeated until the total number of users in said subset of users is at a desired number.

The selecting of said first users may be performed when said first user logs into said online environment and said subsequently selecting may be performed when the first user logs into the online environment on another occasion.

The selecting may take into account one or more parameters associated with said first user.

The at least one or more parameter may comprise one or more of: geographic location of said first user, activity of said first user; and priority of said first user.

A priority of said first user may be dependent on if said first user has one or more of a user name and avatar.

The selecting may select one or more users for said subset which have one or more similar parameters to said first user.

The method may comprise updating said subset of users to remove one or more user and add one or more other users.

The online environment may comprise an online game.

Any one or more of the above methods may be a computer implemented method.

According to another aspect there is provided an apparatus comprising at least one processor and at least one memory wherein said at least one processor is configured to perform any of the above methods.

According to another aspect, there is provided an apparatus, said apparatus comprising at least one processor and at least one memory including computer code for one or more programs, the at least one memory and the computer code configured, with the at least one processor, to cause the apparatus at least to perform any of the above methods.

According to another aspect, there is provided a server comprising: at least one memory configured to store information relating to a plurality of users of an online environment; and at least one processor configured to select a subset of said plurality users for a first user, wherein when in said online environment, the said first user is able to interact with one or more users of said subset of the plurality of users.

The at least one memory may be at partially comprise a queue.

The at least one processor may be configured to assign at least some of said subset of users from the queue.

The at least one processor may be configured to add said first user to the queue, from which said first user can be selected for a subset of users for a different user.

The at least one processor may be configured to add a further user to said subset when said first user is added to a subset associated with said further user.

The at least one processor may be configured to repeat said adding a further user to said subset until the subset of users has a desired number of users.

The at least one processor may be configured to perform said selecting step until the subset of users has a desired number of users.

The at least one processor may be configured to select a first set of users for said subset and subsequently select a further set of users which are added to said subset which contains said first set of user.

The at least one processor may be configured to repeat said subsequent selecting until the total number of users in said subset of users is at a threshold number.

The at least one processor may be configured to perform said selecting of said first users when said first user logs into said online environment and perform said subsequent selecting when the first user logs into the online environment on another occasion.

The at least one processor may be configured to select a subset of the plurality of users of an online environment for a first user taking into account one or more parameters associated with said first user.

The at least one or more parameter may comprise one or more of: country of said first user, activity of said first user; and priority of said first user.

A priority of said first user may be dependent on if said first user has one or more of a user name and avatar.

The at least one processor may be configured to select one or more users for said subset which have one or more similar parameters to said first user.

The at least one processor may be configured to update said subset of users to remove one or more user and add one or more other users.

The online environment may comprise an online game.

According to another aspect there is provided a user device of a first user of an online environment comprising: at least one processor; at least one memory; and an input configured to receive data from a server, said data associated with one or more users selected from a subset of users allocated to said first user, wherein said at least one processor is configured to cause said first user to interact with at least one user of said subset of users.

The interaction with said at least one user may comprise at least one of:
inviting said at least one user to play a game;
playing a game with said at least one user;
sending a message to said at least one user; and
sending notification of an in-game achievement to said at least one user.

A display may be provided, said display configured to display information related to said data associated with one or more users.

The information related to said data associated with one or more users may comprise at least one of:
scores of said one or more users;
avatars of said one or more users;
user names of said one or more users;
location of said one or more users; and
game statistics of said of said one or more users An audio device may be provided, said audio device configured to produce an audio output in response to said data associated with one or more users.

BRIEF DESCRIPTION OF DRAWINGS

For a better understanding of some embodiments, reference will now be made by way of example only to the accompanying drawings in which.

DETAILED DESCRIPTION OF SOME EMBODIMENTS

In the following a user may be a player of a game. The user may interact with another user. For example that user may play against or with another user, one user may help or assist another user, one user may rank themselves against another user, one user may request assistance from another user, one user may communicate with another user and/or have any other suitable interaction. The interaction may involve two or more users. In the following reference is made to a player. However, it should be appreciated that embodiments may be applied to any other suitable user.

Figure 1:
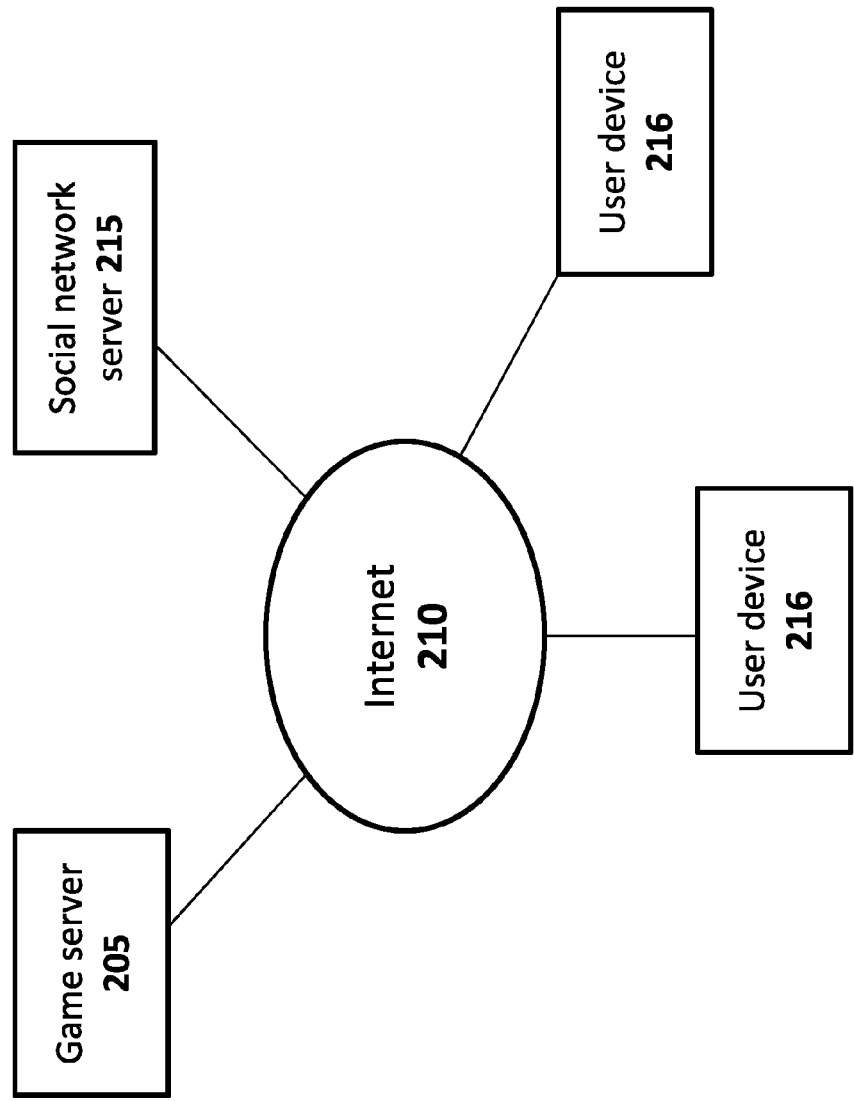
FIG. 1 schematically shows a game environment in which some embodiments may be provided.

Reference is made to FIG. 1 which shows an example of a system in which in some embodiments may be provided. A computer game is stored on a game server 210. In some embodiments, the computer game may be stored on a user device. The computer game may be downloaded to the user device or installed on the user device in any suitable way.

The game may be played on the user device 216. The user device may be any suitable device such as a computer, smart phone, any other handheld device, a kiosk, arcade gaming station, smart TV, any suitable device with computing capabilities, input devices and a screen that can present the game to a player, or the like.

The user device communicates with the game server 205 via for example the Internet 210 and/or any other suitable communications infrastructure. In some embodiments, the communications may be via http-requests.

In some embodiments, the user device may be configured to communicate with a social network server 215. In some embodiments, the social network server may be omitted.

In some embodiments, the social network server 215 and the game server 205 may be provided by a single server.

In some embodiments, a game server 205 may be provided by a plurality of game servers. The social network server 215 may be provided by one or more servers.

Figure 2:
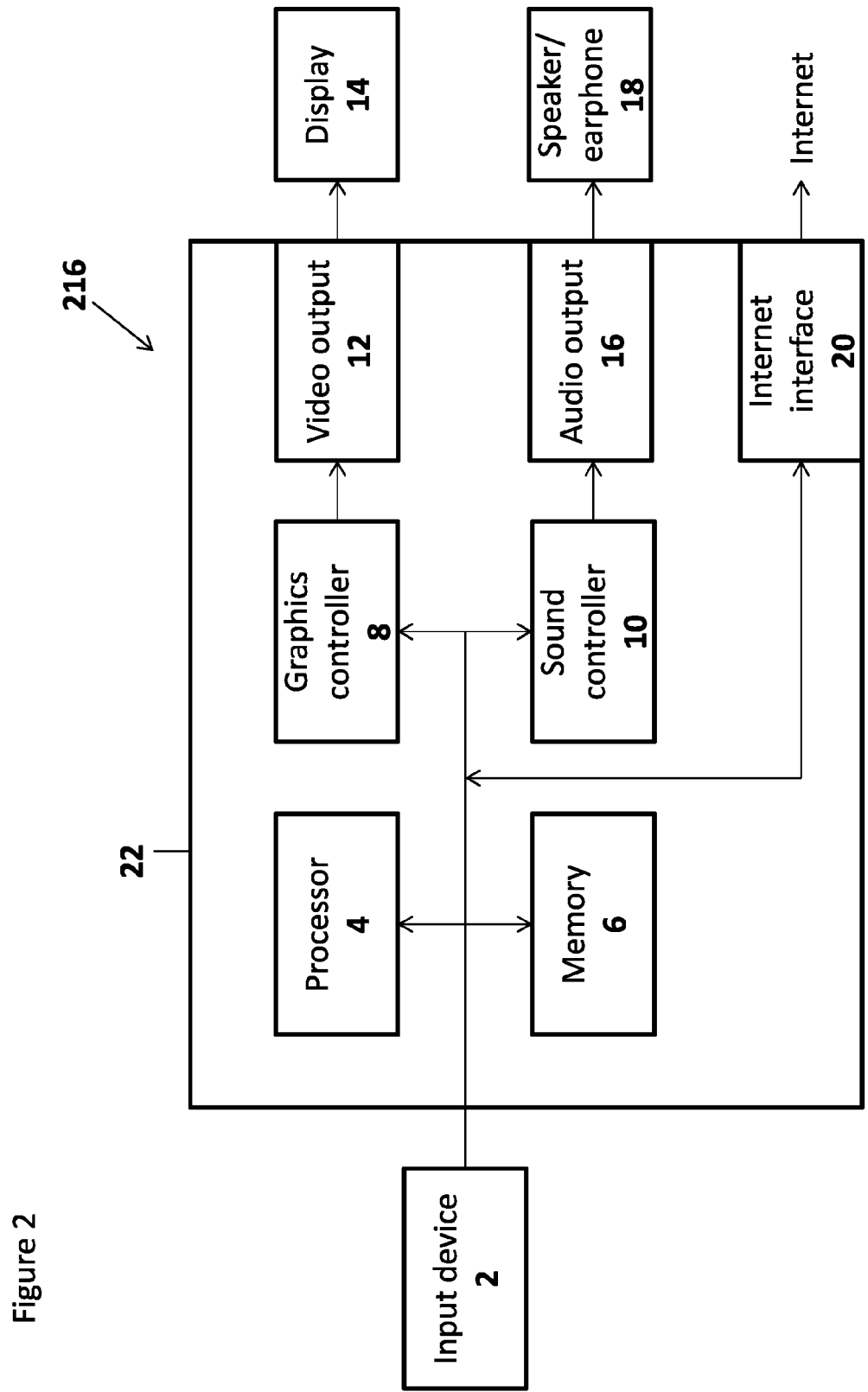
FIG. 2 shows an example of a user device.

A schematic view of a user device 216 is shown in FIG. 2. All of the blocks shown are implemented by suitable circuitry. The blocks may be implemented in hardware and/or software. The user device may have a control part 22. The control part 22 has one or more processors 4 and one or more memories 6. The control part 22 is also shown as having a graphics controller 8 and a sound controller 10. It should be appreciated that one or other or both of the graphics controller and sound controller may be provided by the one or more processors 4.

The graphics controller 8 is configured to provide a video output 12. The sound controller 10 is configured to provide an audio output 16. The controller 22 has an interface 24 allowing the device to be able to communicate with the Internet or other communication infrastructure.

The video output 12 is provided to a display 14. The audio output 16 is provided to an audio device such as a speaker and/or earphone(s) 18.

The device 216 has an input device 2. The input device can take any suitable format and can be one or more of a keyboard, mouse, touch screen, joystick or game controller. It should be appreciated that the display 14 may in some embodiments also provide the input device.

The blocks of the controller 22 are configured to communicate with each other by an interconnect such as a bus or any other suitable interconnect and/or by point to point communication.

It should be appreciated that in some embodiments, the controller 22 may be implemented by one or more integrated circuits, at least in part.

The user device is shown by way of example only. In alternative embodiments, one or more of the parts may be omitted. Alternatively or additionally, some embodiments may comprise one or more other parts. Alternatively or additionally, one or more parts may be combined.

Figure 6:
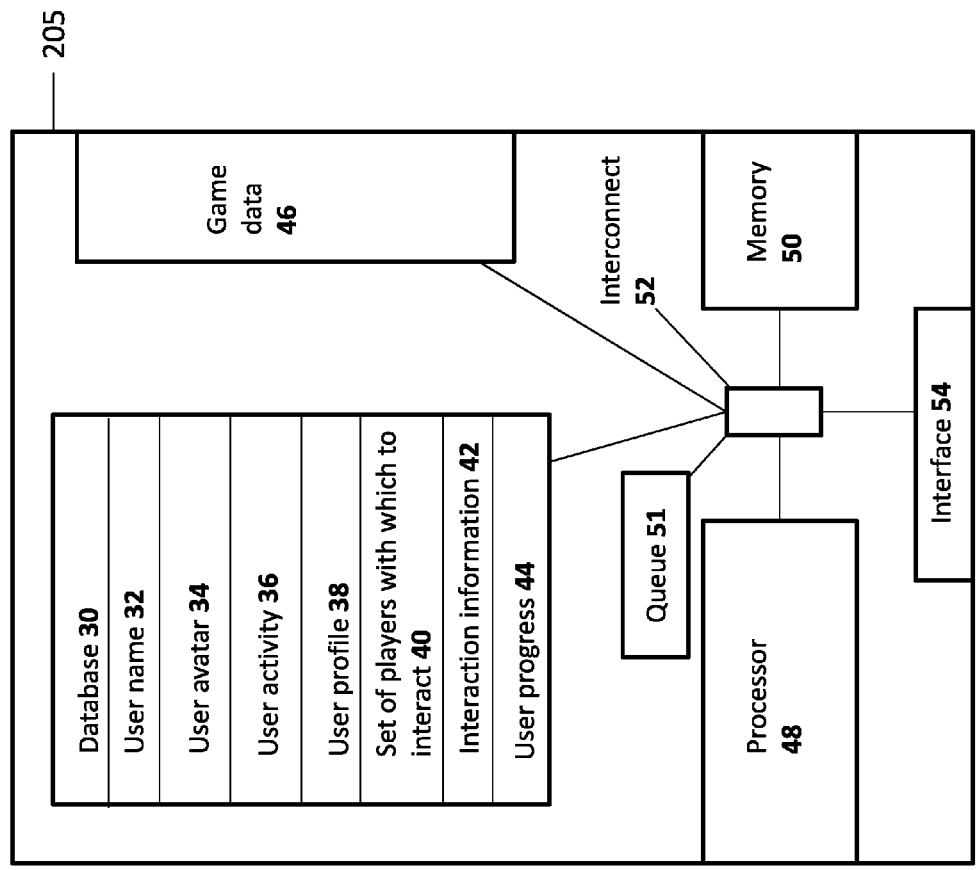
FIG. 6 schematically shows a games server.

Reference is made to FIG. 6 which schematically shows a game server in some embodiments. All of the blocks shown are implemented by suitable circuitry. The blocks may be implemented in hardware and/or software. The game server comprises a database 30. In practice, one or more databases may be provided. Where more than one server is provided, the database may be provided in one database or over two or more servers. The database may comprise one or more of the following data: user name 32, user avatar 34, user activity 36, user profile 38, set of players with which to interact 40, interaction information 42 and user progress 44. Alternative or additional data may be stored in some embodiments. A queue or other suitable memory is provided via which one or more of the users are queued for selection as described later.

The server may have a games data function 46. This may comprise a memory to store the computer program and a processor to run the games program. The games server may comprise at least one processor 48 which may be used to select the group of players with which the player is to interact. At least one memory 50 may be provided which is used by the processor. The memory may comprise for example computer code for a program to be run by the processor. It should be appreciated that the processor 48 may be provided by one or more processors. The memory 50 may be provided by one or more memories. The processor 48 and memory 50 may be provided in a single entity or by different entities. The queue may be part of the one or more memories or separate therefrom.

An interface 54 may be provided to receive data from one or more user devices. The interface may also provide an output to one or more user devices.

An interconnect 52 is provided to allow the blocks of the game server to communicate. The interconnect may be a bus or any other suitable interconnect.

It should be appreciated that in some embodiments, different functions may be performed by different servers.

It should be appreciated that embodiments may be deployed in different gameplay architectures. For example, the computer game can be implemented as a computer game that is stored in the memory of the user device and is run on the processor of the user device. However, the game server will handle some elements of the game. By way of example only, a Java game applet is provided to the user device and the locally running Java applet will generate, for example, the graphics, sounds, and user interaction for the game play on the user device. Some data may be fed back in the game server to allow interaction with other players. The data which is fed back may also allow scoring and/or cross platform synchronization.

In some embodiments, the game may be implemented as a computer program that is stored in the memory of the game server and which runs on the at least one processor of the game server. Data streams or updates are supplied to the user device to allow the user device to render and display graphics and sounds. This approach is sometimes referred to as a web services approach. However, it should be appreciated that such an approach does not necessarily require the use of the Internet.

For some games, a player may wish to play against one or more other players or interact with one or more other players.

Some embodiments may be used with games which potentially have a very large number of players. In one embodiment, a subset of the players is selected as players with which a particular player can interact. This may be performed by the processor in the gaming server. Alternatively or additionally a separate server function may be provided to select the subset of players. The separate server function may be different to the server function which is managing game play.

Figure 3:
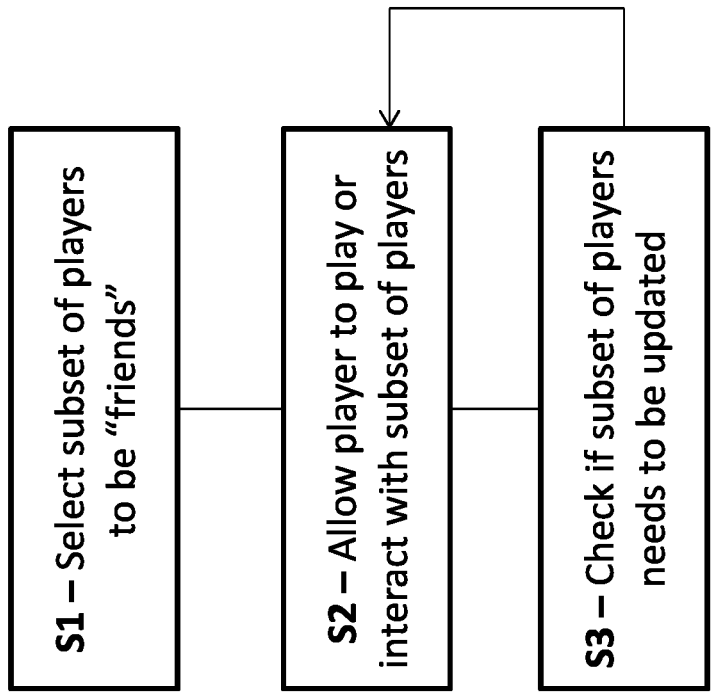
FIG. 3 shows a method of an embodiment for selecting and maintaining a subset of players with a player can interact.

An example of a method will now be described with reference to FIG. 3.

In step S1, a subset of all the players is selected as players with which the current player may interact ("friends"). In some embodiments, the selection is made on a per game type basis. In other embodiments, the selection may be made for two or more game types.

In step S2, the player is allowed to play or otherwise interact with the selected subset of players.

In step S3, the subset of players may be periodically checked to see if it needs to be changed or updated. The player will then use the updated subset of players if changed or updated.

Figure 4A:
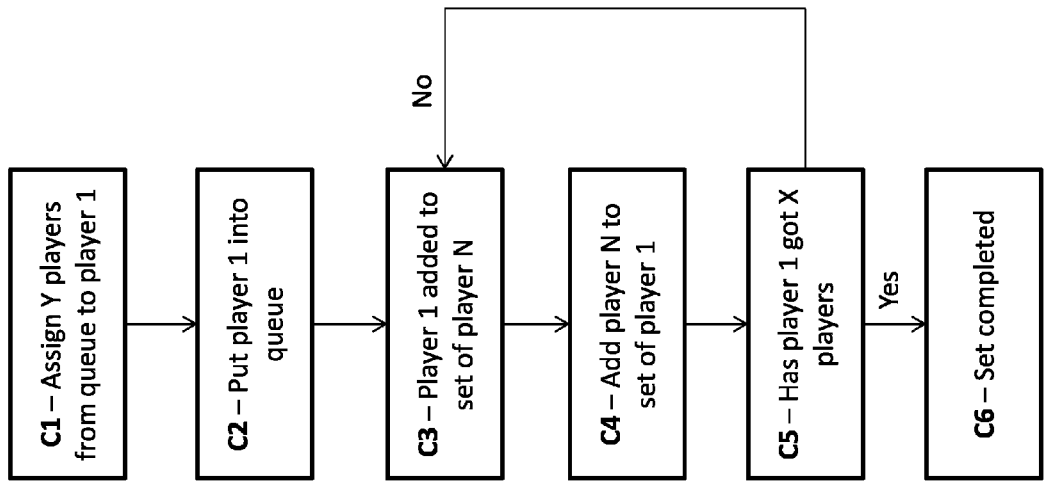
FIG. 4a shows in more detail one method of selection of the subset of players.

Reference is made to FIG. 4a which shows one example of a method used to determine the subset of players to be assigned to a first player, player1.

In this example, a queue is provided. In some embodiments more than two queues can be provided. In some embodiments, a plurality of servers is provided each with one or more queues. This queue may be such that higher priority users are at one end of the queue and lower priority users are provided at the other end of the queue. It should be appreciated that any other suitable method of ranking players may be used. In some embodiments, there may be more than one queue.

In some embodiments, priority will be given to players which have a user name and an avatar. The queue may additionally or alternatively use any other criteria to determine queue priority. The other suitable criteria may be as an alternative to or additional to the above mentioned criteria. By way of example, that other suitable criteria may comprise one or more of: amount of money spent by the player; the progress of the player; the overall activity of the player; recent activity of the player; activity of the player; and the profile of the player. By way of example only, an active player may be one which has been active for at least 2 days and during that time has done at least three log ins. Of course, other definitions of an active player may be provided. In some embodiments, different bands of activity may be defined for a user.

The allocation of a player to a particular queue (where there is more than one queue) may depend on one or more parameters of the user or may be done randomly. For example, a user may be allocated to a queue based on the geographical location of that user and/or the activity of the user and/or the value of that user.

In step C1, when player 1 first comes into a game the player is to be assigned X players with which player 1 is able to interact. In the example shown in FIG. 4A, player 1 is first assigned Y players from the queue. Y may be less than X in some embodiments.

In step C2, player 1 is put into the queue. The position in the queue will depend on the priority associated with player 1.

In step C3, player 1 is added to the set of another player, player N.

In step C4, player N is then added to the set of player 1.

In step C5, it is determined if player 1 has got X players. If not, steps C3, C4 and C5 are repeated.

If player 1 has got X players, then the next step is step C6 when the set is completed.

In some embodiments, the total number of players to be assigned to a particular player over time is larger than X. Accordingly, the method of FIG. 4a may be repeated until the user has the desired number of players. For example, a user may be provided with a total number of players equal to say 10×. The total number of players need not be a multiple of X in some embodiments. Accordingly, the method of FIG. 4A may be repeated 10 times. The method may be repeated at different time intervals, for example each time the player logs on to the game.

It should be appreciated that, the set of players for at least one other player may be processed in parallel.

The players are put into the queue dependent on one or more parameters. These parameters may relate to whether or not they have high value, high activity or not or any other suitable parameter.

In some embodiments, the arrangement of FIG. 4a may be used for a new player.

For an existing player, they may already have friends and/or other players assigned in that game with which they interact. The existing friends will be included in their set of users. The method of FIG. 4a may be used if it is necessary to have further players in the subset.

In some embodiments, if the queue is full of players that are considered better than a player, that player may be assigned X friends without being put into the queue.

In some embodiments, when drawing players from the queue, a geographic parameter such as a country parameter is considered. The geographic parameter may alternatively or additionally be a city, a region of a country, a group of countries or the like. In some embodiments, only players from the same country or other geographic parameter are provided as part of the subset of players. In some embodiments, if not enough players in the same country or other geographic are provided, the next player is in line is taken. Alternatively the geographic location may be expanded.

Figure 4B:
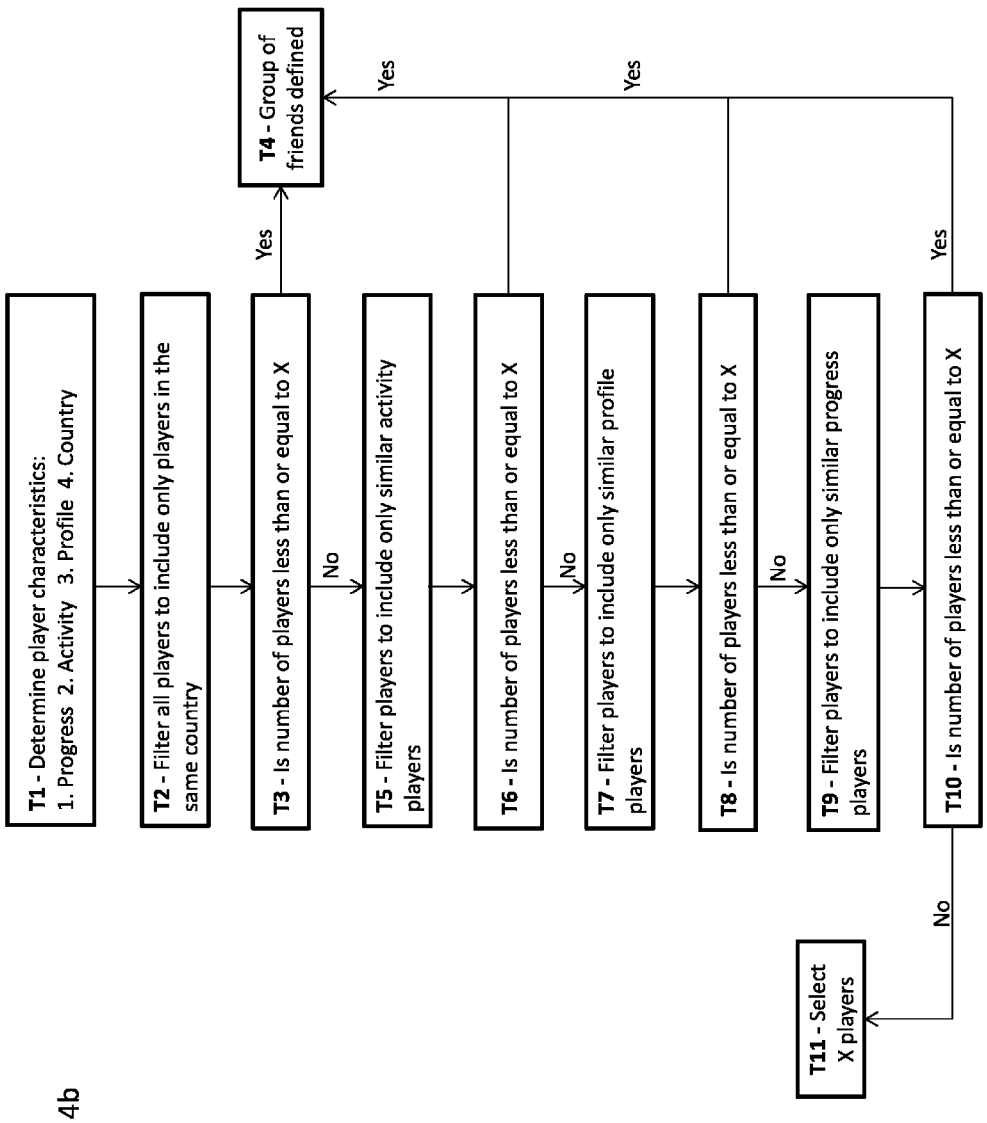
FIG. 4b shows in more detail one method of selection of the subset of players.

Reference is now made to FIG. 4b which shows an alternative embodiment for selecting a subset of users for a player. In step T1, the characteristics of the player are determined. This determination may comprise performing some analysis of data or may comprise the retrieving of data from the database 30. The characteristics may comprise one or more of: a user name, an avatar, the progress of the player in one or more games, the level of activity of the player in one or more games, the game or games played by the player; profile information of the player, and the country in which the player is based. The profile of the player may take into account information such as age, sex, and/or any other suitable information.

In step T2, the set of players is filtered to include only those players in the same country as the current player.

In step T3, a determination is made as to whether or not the number of players is less than or equal to X where X represents the desired number of players in the subset of players for a particular user. If the number of players is less than or equal to X, then the next step is step T4. The country filtered players will provide the subset of players with which the current player will interact.

It may be that the number of players is significantly less than X. In this case, step T2 may be repeated with two or more countries. The two or more countries may be selected based on geographic proximity, common language, and/or any other suitable criteria.

If the number of players is not less than or equal to X, the next step is step T5. In step T5 the subset of players, filtered by country, are then filtered again to provide only players with a similar activity level to the current player.

This is followed by step T6 where it is again determined if the number of players is less than or equal to X. If the number of players is less than or equal to X, then the next step is T4.

If the number of players is not less than or equal to X, then the next step is step T7. In this step, the subset of players filtered by country and activity is further filtered to include only players with a similar user profile to the current user. For example, the group may be filtered to include any one or more of the profile examples mentioned previously.

This is followed by step T8. This again is a check whether the number of players is less than or equal to X. If so, the next step is step T4. If not, the number of players is filtered to further include only those players on a similar progress level to the current player, in step T9.

This is followed by step T10 in which again it is determined if the number of players is less than or equal to X. If so, the group of players is defined (step T4).

If not, this may be followed by step T11 where x players are selected out of the remaining subset.

It should be appreciated that the flows shown in FIGS. 4a and 4b are by way of example only. Any one or more of the steps may be omitted. Any two or more steps may be combined. Any one or more alternative or additional steps may be provided. The steps shown in FIGS. 4a and b can take place in any order.

It should be appreciated that any one or more individual filtering step of FIG. 4b may have a target number of players, in some embodiments. Accordingly, each individual step may be subject to an iterative process changing the parameters used. By way of example only, for step T5, the similar activity range may be relatively broadly defined. If the number of players provided is too large, then the filtering step can be repeated with a narrower band. Of course, it is possible to initially start with a relatively narrow band and then to increase the band to include more players if not enough players are provided.

Some embodiments may prioritize the selection of players which are active in the same game.

Some embodiments may prioritize players having a similar progress level.

Some embodiments may prioritize players which have an avatar and a display name. This is because this may make them relevant and recognizable to another user. It should be appreciated that this is one example of profile data.

In some embodiments, the avatar is provided with a flag icon so that players can see that they are playing from other players of their own or a different country.

In some embodiments, a player is able to select one or more players to be part of the subset based on the player sending a request for that player to be part of the subset and receiving a response accepting the request. This may be a reciprocal arrangement so that if a player receives a request and accepts that request, the player making the request will be added to the subset of players. These players will be included in the subset of players and will remain in the subset regardless of whether the player satisfies a criterion to be retained in the subset. This is described in more detail in relation to FIG. 7 later.

The arrangement shown in FIG. 4a or 4b provides a way in which an initial selection of a subset of players may be made. However, over time, it is likely that this subset of players should be changed.

Figure 5A:
FIG. 5a schematically shows in more detail one method of updating of the subset of players.

FIG. 5a shows one example as to how the subset of players can be updated. In step F1, it is determined if the number of players has reached a maximum number. In step F2, it is determined if any of the players are inactive or not active enough. In suitable method or criteria can be used to determine if a player is considered inactive or not active.

In step F3, the inactive players are discarded and new players are added to the subset. This may be done using one of the methods or part of a method as described above.

It should be appreciated that one or more of the above steps may be combined.

Figure 5B:
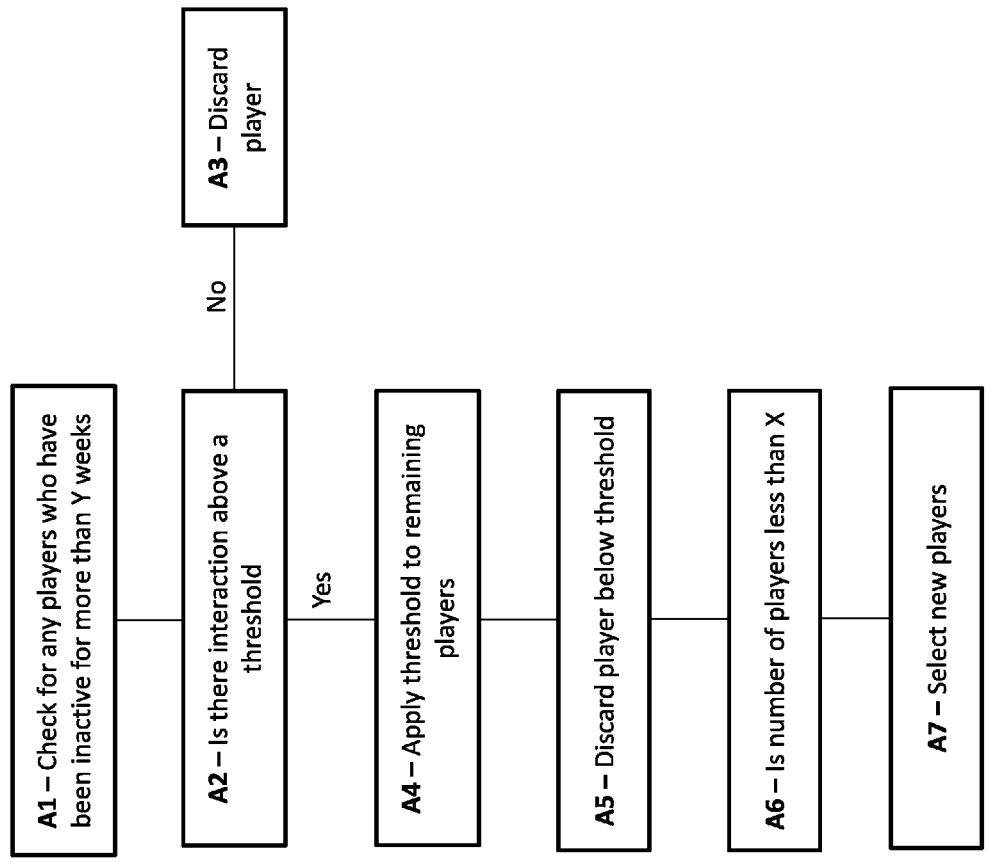
FIG. 5b schematically shows in more detail one method of updating of the subset of players.

Reference is made to FIG. 5b which shows an alternative method for updating friends.

In step A1, a check is made for any players who do not satisfy one or more given criteria. This may be activity-criteria such as a not satisfying a threshold amount of activity or being inactive for longer than time Y. Y can be any suitable length of time and in some embodiments may be measured in days, weeks or months. In some embodiments, those inactive players will be removed from the subset of players unless there is a reason to retain that player. This may be where there has been a request/response process such as described above.

In some embodiments, each time a player interacts with another player, this interaction is recorded in the database.

An interaction may comprise one or more of: playing a game with a player, helping a player, or any other traceable communication.

In one implementation, each time an interaction occurs a value in the database is incremented.

In step A2, for a player who has been inactive for longer than Y, a check will be made to see whether or not the interaction is above a threshold value. If the interaction value associated with the inactive player is below the threshold, then that player will be discarded as shown in step A3.

In some embodiments, an inactive player is discarded and the check of step A2 is not carried out.

It should be appreciated that the subset set of players in its entirety, regardless of the activity of the players, may be subject to the comparison as shown in step A3 and any friends which have an interaction level above a threshold are retained and those below the threshold are discarded (step A5).

In step A6, a check is made to see if the number of players is less than X. If not, the updating of the subset is finished. If not, the next step is step A7 in which new players are selected. This may be done by using the method of FIG. 5b.

It should be appreciated that one or more of the steps of FIG. 5a or 5b may be omitted. One or more of the steps of FIG. 5a or 5b may be carried at the same time as one or other of the steps of FIG. 5a or 5b The steps of FIG. 5a or 5b may be carried out in any suitable order. It should be appreciated that steps of FIGS. 5a and 5b may be combined in some embodiments.

Figure 7A:
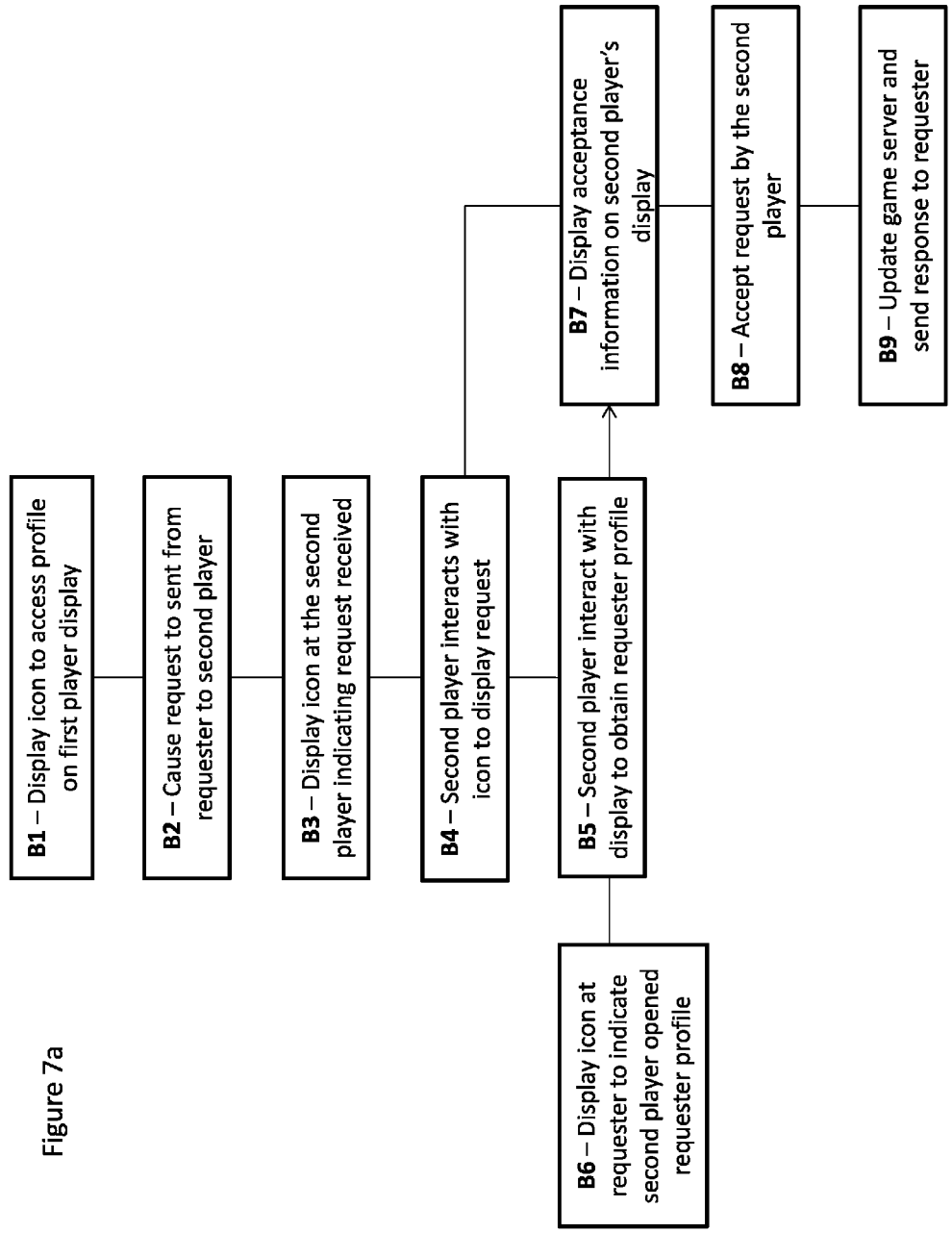
FIG. 7a shows a method of interacting with another user.

Reference is now made to FIG. 7a which shows the flow where one player sends a request to another player that player to be part of the subset of players.

In step B1 the display of the user device of player 1 (the requester) will have an icon which will allow access to the profile information of player 1. By interacting with this icon, this may cause a different screen to be displayed to player 1. This screen may have an icon which will allow the requester to send a request to another player, player 2. This request is sent from the user device, via the network to the game server. The game server will then send that request to that second player. This is carried out in step T2.

In step B3, the request is received at the user device of the second player. The display may be in the form of an icon which indicates that a request has been received.

In step B4, the second player interacts with the icon to display the request. When the request is displayed, acceptance information is displayed on the second players display. This is in step T7. The acceptance information may comprise an icon which says yes and an icon which says no, or the like.

Optionally, the second player can interact with the display to obtain further information on the requester, for example at least a part of the requester's profile. The requester's profile can be obtained by the second player by sending a request to the game server and receiving that information from the games server. Alternatively, the profile information may be included in the request. Interacting with this display to obtain the requester's profile may cause information to be sent to the game server which is then sent to the requester. In step B6, this causes an icon to be displayed at the requester to indicate that the second player has opened the requester's profile.

In step B8, the second player accepts the request from the first player. It should be appreciated that the method will end if the second player ignores or rejects the request.

In step B9, a response is sent by the user device of the second player which causes the game server to be updated. The game server will send the response to the requester indicating that the request has been accepted.

The information which is displayed to the user may be in the form of an icon and the user is able to activate the icon using a cursor controlled in any suitable fashion, the user touching the icon, or any other suitable way. It should be appreciated that some embodiments may be implemented differently and not require the display of an icon.

Figure 7B:
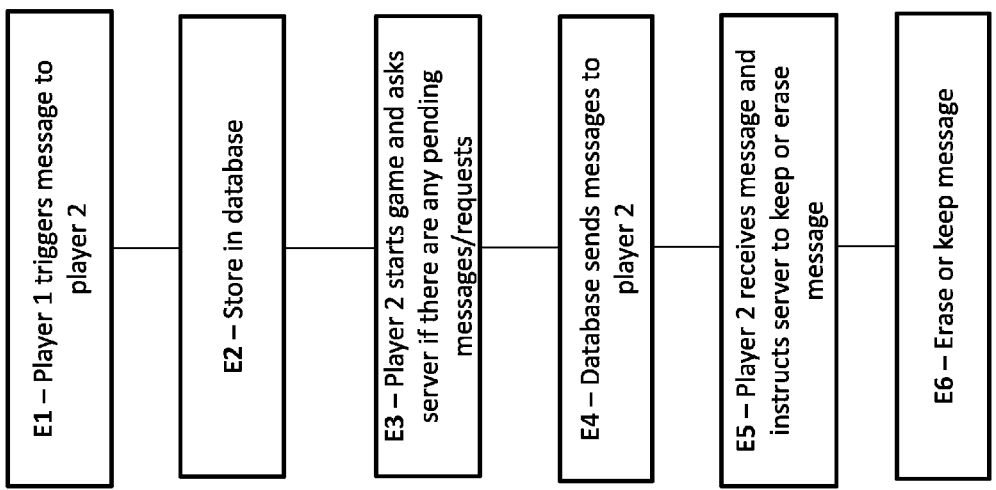
FIG. 7b shows a second method of interacting with another user.

Reference is made to FIG. 7b which shows another example of messaging in an embodiment.

In step E1, the client of player 1 will trigger a message to go to player 2.

In step E2, this message will be stored in the database of the server.

In step E3, the client of player 2 will request from the server if there are any pending messages or requests. This may be done when player 2 starts playing the game or may be done when player 2 logs in. Alternatively, the request which is sent to the server may be triggered when desired or at regular intervals. In some embodiments, the request sent to the server to see if there are any pending messages may be done automatically.

In step E4, the database will send the messages to client of player 2 for display.

In some embodiments, in step E5, player 2 receives messages and player 2 or the client of player 2 will then instruct the server to keep or erase the message.

In step E6, the server will erase or keep message as instructed.

It should be appreciated that in some embodiments, as soon as the database has sent the message to player 2, the message is automatically deleted from the database. In some embodiments, steps E3 to E5 will be repeated until player 2 or the client of player 2 requests the database to erase the message. In some embodiments, a time stamp may be put on the message. The message may be automatically deleted after the expiry of a given length of time.

It should be appreciated that in some embodiments, some of the steps of FIG. 7a or b may be omitted.

In some embodiments, the method of FIG. 7a or b will apply across all games.

In some embodiments, when a player selects a different game, hosted by the same platform, the same subset of players will be used for that different game. Alternatively, a new subset of players may be selected for the new game.

In some embodiments, a player can remove a player from his subset by sending a notification to the games server. It should be appreciated that the removed player may then be seen as a 'relatively low value'. This may make it harder for the player to be added to another player's subset. It should be appreciated that in some embodiments, if a player is removed z times from a subset, that player may be banned from all subsets.

In some embodiments, if the player has a relatively high interaction value, that player will be removed from subset but will be available as normal for selection for a different subset.

If a player has become a member of a subset by way of a request procedure, the removal of the player from subset may not result in any downgrading of that removed player.

In the above described embodiments, reference has been made to the selection of a subset of players with which a particular user is able to interact. It should be appreciated that alternative embodiments, may be provided in any other suitable online environment. A user may be provided with a subset of users with which the user is able to interact. The interaction may not involve the playing of a game but may be any other suitable context.

In some embodiments, a first user may be presented with the option of interaction with one or more users of the subset of users allocated to the first user. Information about the one or more users of the subset may be received from the server and may be displayed. When a second user is selected for interaction, information is sent from the device of the first user to the device of the second user. Alternatively or additionally information may be sent from the server to both the user device of the first user and the user device of the second user. Information from the user device of the first user may be displayed on the user device of the second user. The connection may be via the server and/or via the internet. Any other suitable communication path may be provided. Information from the first user may be displayed on the user device of the second user. There may be a two way communication path between the first and second users. In some situations, there may be interaction between more than two users.

Some embodiments may be used in the context of an online game system capable of connection with a user through a communication network to provide an online game to the client. The system may comprise one or more user devices and one or more servers, such as described previously.

Some embodiments may provide a system for providing a subset of users with which one user may be able to interact.

Various methods have been described. It should be appreciated that these methods will be implemented in apparatus, where the apparatus is implemented by any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor.

It is also noted herein that while the above describes exemplifying embodiments of the invention, there are several variations and modifications which may be made to the disclosed solution without departing from the scope of the present invention.

We claim:

1. A computer-implemented method for providing an online environment where two or more users can interact, comprising the following, implemented by at least one processor in communication with a memory:

Selecting, from the memory, the memory storing user data about users of the online environment, a first subset of said users of the online environment with which a first user may interact, said data comprising activity information, adding at least one further user to the first subset of users with which the first user can interact when said first user is added to a second subset of users associated with said at least one further user;

determining whether the first subset of users has a predefined number of users; and if it is determined that the first subset of users does not have the predefined number of users, selecting at least one further user to be added to said first subset, wherein said selecting at least one further user is performed N times until the first subset of users has the predefined number of users, where N is an integer and wherein when in said online environment, said first user interacts with one or more users of said first subset of the plurality of users;

determining that said first subset comprises one or more users who have not been active for longer than a predetermined time period, and removing said one or more users who have not been active for longer than said predetermined time period from said first subset;

further determining whether said first subset of users has a predetermined number of said users;

and if not, selecting at least one further user to be added to said subset such that said first subset has the predefined number of users.

2. A method as claimed in claim 1, wherein said selecting comprises assigning at least some of said first subset of users from a queue.

3. A method as claimed in claim 1, comprising adding said first user to a queue, from which said first user can be selected for a subset of users for a different user.

4. A method as claimed in claim 1, wherein said selecting users of said first subset is performed when said first user logs into said online environment and said subsequently selecting one or more further users is performed when the first user logs into the online environment on another occasion.

5. A method as claimed in claim 1, wherein said selecting a first subset of said users of the online environment takes into account one or more parameters associated with said first user.

6. A method as claimed in claim 5, wherein said one or more parameters comprise one or more of: geographic location of said first user, activity of said first user; and priority of said first user.

7. A method as claimed in claim 5, wherein said one or more parameters comprise a priority of said first user which is dependent on if said first user has one or more of a user name and an avatar.

8. A method as claimed in claim 5, wherein said selecting a first subset of said users of the online environment comprises selecting one or more users for said first subset which have one or more similar parameters to said first user.

9. A method as claimed in claim 1, comprising updating said subset of users to remove one or more users and add one or more other users.

10. A method as claimed in claim 1, wherein said online environment comprises an online game.

11. A server for providing an online environment where two or more users can interact comprising:

at least one memory configured to store user data about users of the online environment, said data comprising activity information; and at least one processor configured to select, from the memory, a first subset of said users of the online environment with which a first user may interact, add at least one further user to the first subset of users with which the first user can interact when said first user is added to a second subset of users associated with said at least one further user;

determine whether the first subset of users has a predefined number of users; and if it is determined that the first subset of users does not have the predefined number of users, to select at least one further user to be added to said first subset, wherein said selecting at least one further user is performed N times until the first subset of users has the predefined number of users, where N is an integer and wherein when in said online environment, said first user interacts with one or more users of said first subset of the plurality of users;

determine that said first subset comprises one or more users who have not been active for longer than a predetermined time period, and remove said one or more users who have not been active for longer than said predetermined time period from said first subset;

further determine whether said first subset of users has a predetermined number of users;

and if not, select at least one further user to be added to said subset such that said first subset has the predefined number of users.

12. The server as claimed in claim 11, wherein said at least one processor is configured to assign at least some of said first subset of users from a queue.

13. The server as claimed in claim 11, wherein said at least one processor is configured to add said first user to a queue, from which said first user can be selected for a subset of users for a different user.

14. The server as claimed in claim 11, wherein said at least one processor is configured to select a first set of users for said first subset and subsequently select a further set of users which are added to said first subset which contains said first set of users.

15. The server as claimed in claim 14, wherein said at least one processor is configured to perform said selecting of said first set of users when said first user logs into said online environment and perform said subsequent selecting when the first user subsequently logs on to the online environment.

16. A computer-implemented method for providing an online environment where two or more users can interact, comprising the following, implemented by at least one processor in communication with a memory:

selecting, from the memory, the memory storing user data about users of the online environment, a first subset of said users of the online environment with which a first user may interact, said data comprising activity information;

adding at least one further user to the first subset of users with which the first user can interact when said first user is added to a second subset of users associated with said at least one further user;

determining whether the first subset of users has a predefined number of users; and if it is determined that the first subset of users does not have the predefined number of users, selecting at least one further user to be added to said first subset, wherein said selecting at least one further user is performed N times until the first subset of users has the predefined number of users, where N is an integer and wherein when in said online environment, said first user interacts with one or more users of said first subset of the plurality of users;

determining that said first subset comprises one or more users who have not been active for longer than a predetermined time period, and removing said one or more users who have not been active for longer than said predetermined time period from said first subset;

further determining whether said first subset of users has a predetermined number of said users;

and if not, selecting at least one further user to be added to said subset, wherein said selecting a first subset of said users of the online environment takes into account a priority of said first user which is dependent on if said first user has one or more of a user name and an avatar.

17. A computer-implemented method for providing an online environment where two or more users can interact, comprising the following, implemented by at least one processor in communication with a memory:

selecting, from the memory, the memory storing user data about users of the online environment, a first subset of said users of the online environment with which a first user may interact, said data comprising activity information;

adding at least one further user to the first subset of users with which the first user can interact when said first user is added to a second subset of users associated with said at least one further user;

determining whether the first subset of users has a predefined number of users; and if it is determined that the first subset of users does not have the predefined number of users, selecting at least one further user to be added to said first subset, wherein said selecting at least one further user is performed N times until the first subset of users has the predefined number of users, where N is an integer and wherein when in said online environment, said first user interacts with one or more users of said first subset of the plurality of users;

determining that said first subset comprises one or more users who have not been active for longer than a predetermined time period, and removing said one or more users who have not been active for longer than said predetermined time period from said first subset;

further determining whether said first subset of users has a predetermined number of said users;

and if not, selecting at least one further user to be added to said subset, wherein selecting users of said first subset is performed when said first user logs into said online environment and subsequently selecting one or more further users for said first subset is performed when the first user logs into the online environment on another occasion.

18. A server for providing an online environment where two or more users can interact comprising:

at least one memory configured to store user data about users of an the online environment, said data comprising activity information; and at least one processor configured to select, from the memory, a first subset of said users of the online environment with which a first user may interact, add at least one further user to the first subset of users with which the first user can interact when said first user is added to a second subset of users associated with said at least one further user;

determine whether the first subset of users has a predefined number of users; and if it is determined that the first subset of users does not have the predefined number of users, to select at least one further user to be added to said first subset, wherein said selecting at least one further user is performed N times until the first subset of users has the predefined number of users, where N is an integer and wherein when in said online environment, said first user interacts with one or more users of said first subset of the plurality of users;

determine that said first subset comprises one or more users who have not been active for longer than a predetermined time period, and remove said one or more users who have not been active for longer than said predetermined time period from said first subset;

further determine whether said first subset of users has a predetermined number of said users;

and if not, select at least one further user to be added to said subset;

wherein said selecting a first subset of said users of the online environment takes into account a priority of said first user which is dependent on if said first user has one or more of a user name and an avatar.

19. A server for providing an online environment where two or more users can interact comprising:

at least one memory configured to store user data about users of an the online environment, said data comprising activity information; and at least one processor configured to select, from the memory, a first subset of said users of the online environment with which a first user may interact, add at least one further user to the first subset of users with which the first user can interact when said first user is added to a second subset of users associated with said at least one further user;

determine whether the first subset of users has a predefined number of users; and if it is determined that the first subset of users does not have the predefined number of users, to select at least one further user to be added to said first subset, wherein said selecting at least one further user is performed N times until the first subset of users has the predefined number of users, where N is an integer and wherein when in said online environment, said first user interacts with one or more users of said first subset of the plurality of users;

determine that said first subset comprises one or more users who have not been active for longer than a predetermined time period, and remove said one or more users who have not been active for longer than said predetermined time period from said first subset;

further determine whether said first subset of users has a predetermined number of said users;

and if not, select at least one further user to be added to said subset, wherein selecting users of said first subset is performed when said first user logs into said online environment and subsequently selecting one or more further users for said first subset is performed when the first user logs into the online environment on another occasion.

* * * * *